United States Patent
Kiviranta et al.

(10) Patent No.: US 7,979,080 B2
(45) Date of Patent: Jul. 12, 2011

(54) HANDOVER-BASED METHOD FOR ANONYMOUS OBSERVATION OF A MOVING SUBSCRIBER

(75) Inventors: Veli-Matti Kiviranta, Espoo (FI); Juha Nykopp, Tampere (FI); Olli Knuuttila, Kauniainen (FI)

(73) Assignee: Elisa Matkapuhelinpalvelut Oy, Helsinki (FI)

( * ) Notice: Subject to any disclaimer, the term of this patent is extended or adjusted under 35 U.S.C. 154(b) by 102 days.

(21) Appl. No.: 11/230,178

(22) Filed: Sep. 19, 2005

(65) Prior Publication Data

US 2006/0009222 A1    Jan. 12, 2006

Related U.S. Application Data

(63) Continuation of application No. PCT/FI2004/050031, filed on Mar. 22, 2004.

(30) Foreign Application Priority Data

Mar. 24, 2003   (FI) ..................................... 20030427

(51) Int. Cl.
*H04W 24/00* (2009.01)
*H04W 36/00* (2009.01)

(52) U.S. Cl. ............... 455/456.5; 455/456.1; 455/456.2; 455/436; 455/440

(58) Field of Classification Search ............... 455/412.1, 455/456.1–456.6, 436–444
See application file for complete search history.

(56) References Cited

U.S. PATENT DOCUMENTS

| | | | |
|---|---|---|---|
| 5,884,175 A * | 3/1999 | Schiefer et al. | 455/436 |
| 6,047,183 A | 4/2000 | Kingdon et al. | |
| 6,061,565 A * | 5/2000 | Innes et al. | 455/436 |
| 6,169,899 B1 | 1/2001 | Havinis et al. | |
| 6,181,682 B1 * | 1/2001 | Abbadessa et al. | 370/328 |
| 6,295,455 B1 | 9/2001 | Fischer et al. | |
| 6,522,888 B1 * | 2/2003 | Garceran et al. | 455/456.3 |
| 6,631,263 B1 * | 10/2003 | Corkery | 455/436 |
| 2003/0087647 A1 * | 5/2003 | Hurst | 455/456 |
| 2004/0043775 A1 * | 3/2004 | Kennedy et al. | 455/456.2 |
| 2004/0203883 A1 * | 10/2004 | Jollis | 455/456.1 |

FOREIGN PATENT DOCUMENTS

| | | |
|---|---|---|
| EP | 1 482 759 A2 | 12/2004 |
| WO | WO 00/28768 | 5/2000 |
| WO | WO 02/03350 A1 | 1/2002 |
| WO | WO 03/041031 A1 | 5/2003 |

* cited by examiner

*Primary Examiner* — George Eng
*Assistant Examiner* — Nam Huynh
(74) *Attorney, Agent, or Firm* — Cohen Pontani Lieberman & Pavane LLP

(57) ABSTRACT

A location of a subscriber can be observed by means of a mobile network in a completely anonymous way, without a subscriber identifier or a temporary subscriber identifier. At first, a method extracts from a first time slot of a radio channel a message which includes information about a second time slot of a radio channel. The first time slot of a radio channel discloses the current cell of the subscriber and the second time slot of a radio channel discloses a new cell of the subscriber. A location of the subscriber is determined on the basis of the current and the new cell. This location is approximately situated in a geographical intersection area of the current and the new cell. Different kinds of statistics can be deduced from the observations concerning activities of subscribers.

7 Claims, 2 Drawing Sheets

HANDOVER-BASED METHOD FOR ANONYMOUS OBSERVATION OF A MOVING SUBSCRIBER

CROSS REFERENCE TO RELATED APPLICATION

This is a continuation of PCT Application No. PCT/FI2004/050031, filed on Mar. 22, 2004.

BACKGROUND OF THE INVENTION

1. Field of the Invention

The present invention relates generally to collecting information about moving subscribers by means of a mobile network.

2. Description of the Related Art

In general, it is known to use a mobile network for locating subscribers, but the mobile network can be used in new ways for localization. For example, the applicant's prior patent applications FI20012139 and FI20030086 describe new ways to utilize mobile networks. These two patent applications and the present application share the characteristic in which way certain basic features of the mobile networks are utilized for locating mobile subscribers.

Patent application FI20030086 discloses such basic terms of prior art that are relevant also for the invention of the present application, thus we refer to the said patent application as an information source for the basic terms.

The method described in patent application FI20030086 comprises the following steps. At first, messages belonging to a certain message set are collected from the areas of a mobile network in which a terminal communicates with the mobile network using messages of the message set. These areas are border areas that are situated between location areas of the mobile network. Depending on a statistical survey, or another analysis to be performed, the border areas may be, for example, such road stages on which velocities of vehicles are measured. In general, the border areas are areas through which mobile subscribers move to the areas interested in a survey, or from which users can move out. The number of different types of users can be calculated by detecting the users' movements in the border areas. If required, the velocities of the users can also be calculated. When a message includes a temporary subscriber identifier, it is used for fetching a subscriber identifier from a subscriber database or from the subscriber data stored in a memory. Lastly, initial data is formed using subscriber identifiers. A part of those subscriber identifiers may be from the collected messages and another part may be from the subscriber data. A single subscriber identifier may be, for example, an IMSI that includes the following information: an initial value disclosing a country, an initial value disclosing an operator, and an initial value disclosing a subscriber.

FIG. 1 shows ways to implement the system described in the patent application FI20030086, assuming that the system is constructed within a mobile communication system. In the first embodiment network elements, such as signal analyzers 151, are added to the mobile communication system. Traffic important for the invention, i.e. the traffic between base stations and base station controllers, is monitored by means of the added network elements. The signal analyzer 151 is preferably connected to the point P1 in order to monitor signal traffic which is led through a 2 Mb E1 cable from a base station to a base station controller. More than one signal line can be assigned to the same base station controller, for example, the point P2 in FIG. 1. Typically one signal analyzer monitors from eight to sixteen E1 connections, each of which can be connected to twelve transmitter/receiver units, i.e. TRXs, when using the GSM technique. The signal analyzer 151 may include a user interface for specifying necessary information and the messages to be monitored. When the signal analyzer 151 detects a message of a certain type on the basis of an identifier of the message, the signal analyzer collects said message and sends data in accordance with its definitions to the address of the predetermined calculating server 150. The address of said server may be, for example, an IP or another network address, and/or a port address. If the system is intended for calculating velocities of subscribers, the velocities can be stored in the traffic database 155.

Network elements, such as the signal analyzer 152, are used in the second embodiment of the system. They are connected to monitor at the location points P3 traffic between a base station controller and the exchange 103 or the VLR 102.

Network elements, such as base stations, base station controllers, exchanges, or a VLR, are changed in the third embodiment. These elements can send certain messages to the server in order to collect information needed for the localization process.

In the fourth embodiment known charging records, such as the CDR (Charging Data Record), are used in a new way. In this embodiment an exchange of a mobile network, e.g. an MSC, is adapted to write a charging record when a terminal is moved into and out of a certain location area. For example, when the terminal 101 detects that the LAI of a new cell differs from the LAI of the cell that had the best audibility a little while ago, the terminal informs the VLR 102 via the MSC 103. Then the MSC receives a Location Updating Request message sent by the terminal, writes a charging record, and sends the charging record, or at least a part of its data content 160 either directly or via a data storage unit to the calculating server 150. Depending on the equipment deliverer, the data content 160 may include identifier data, such as an IMSI. Because it is possible to listen to the radio interface, hostile parties may locate users of the mobile network without their knowledge. In order to avoid this, a pseudo identifier, i.e. Temporary Mobile Subscriber Identity (TMSI), is taken into use. The relation between the TMSI and IMSI is stored in the VLR and in the mobile phone.

The above-described embodiments are related to the following drawbacks.

First, borders of location areas are not necessarily situated in the areas where movements of subscribers interested in a statistical survey are happening. This especially concerns the location area defined by a Location Area Identifier (LAI) or a Location Area Code (LAC) identifier (a LAI includes a LAC together with a country identifier or an operator identifier). In the method of the patent application FI20030086 observations about users are usually obtained, for example, when a location area (LAC) of a subscriber and a TMSI of the subscriber change.

Secondly, use of TMSI identifiers for locating subscribers cause VLR requests which load the mobile network.

Thirdly, the successful use of the TMSI identifiers requires that, if needed, the IMSI identifiers related to the TMSI identifiers can be fetched from a network of another mobile operator. It is possible that the other mobile operator is not cooperative in this matter, or the fetching of the IMSI identifiers becomes too expensive.

Fourthly, even use of TMSIs for the localization may be problematic because of data privacy and data security.

SUMMARY OF THE INVENTION

One of the objectives of the invention is to eliminate the drawbacks of a location system which utilizes a mobile network. A subscriber can be located in a completely anonymous way, without a subscriber identifier or a temporary subscriber identifier. In addition, the areas that are to be located in a statistical survey, or in another analysis, can be selected from a larger set of areas. Instead of LAC areas, it is possible to select cells inside the LAC areas.

The basic idea of the inventive method is to extract messages that are included in handover commands. A HandOver Command message sent by a mobile network is, for example, such a message. Observations concerning subscribers of the mobile network are based on the extracted messages. For example, the location information of a subscriber or the velocity of the subscriber may be observed in a certain point of time. Different types of statistics that describe an activity of subscribers can be calculated on the basis of these observations.

The method for locating a subscriber comprises the following steps. A first message transmitted in the mobile network is extracted by extracting means through an Abis interface, the first message defining a current cell of a subscriber terminal of the mobile network and the first message including a piece of information on the basis of which a second message transmitted in the mobile network is to be extracted. A second message which defines a new cell of the subscriber terminal is extracted by the extracting means through the Abis interface, wherein the first and second messages are extracted from signal traffic of at least one E1 connection of the Abis interface. A calculating server determines a location of the subscriber on the basis of the current cell defined by the first message and the new cell defined by the second message, wherein the location is at least partly situated in a geographical intersection of the current and new cells, and wherein the calculating server determines a first border area of the geographical intersection based on the first message and a second border area of the geographical intersection based on the second message. Then the location of the subscriber is determined anonymously on the basis of the current cell and the new cell defined by the first and second messages, i.e., the location of the mobile station is at least partly located in the geographical intersection of the current cell and the new cell.

The method further comprises the following steps for calculating the velocity of the subscriber. At first, the method attaches a time stamp to the message disclosing the location. The method also stores the message and its time stamp in a memory, wherein the time stamp discloses a point of time when the message was extracted. When the current cell of the subscriber is changed to a new cell and the subscriber is moving from the new cell to a subsequent cell, the method extracts the message transmitted in the mobile network in a second time slot of a radio channel. The said message includes information about a third time slot of a radio channel, which has been started to be used during the subsequent handover of the subscriber of the mobile network. The third time slot defines the subsequent cell of the subscriber. The method determines another location of the subscriber on the basis of the new cell and the subsequent cell. The other location is at least partly situated in the intersection of said cells. The method determines a distance traveled by the subscriber on the basis of the second location and the location stored in the memory. The method determines the velocity of the subscriber on the basis of the distance traveled by the subscriber and the time stamp disclosing the point of time of the first extracted message, and on the basis of the time stamp disclosing the point of time of the second extracted message.

A system according to the invention utilizes the above-described method. The system preferably comprises signal analyzers for extracting messages. By examining said messages a subscriber can be quite assuredly observed in the area of interest in a statistic survey or in another analysis.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described more closely with reference to the accompanying drawings, in which.

DETAILED DESCRIPTION OF THE PRESENTLY PREFERRED EMBODIMENTS

Maybe the most unique characteristic of the invention is that a subscriber/mobile station is located on the basis of just one message. In this regard the present invention differs from the method described in patent application FI20030427 in which a subscriber/mobile station is located by means of a message pair.

Figure 2:
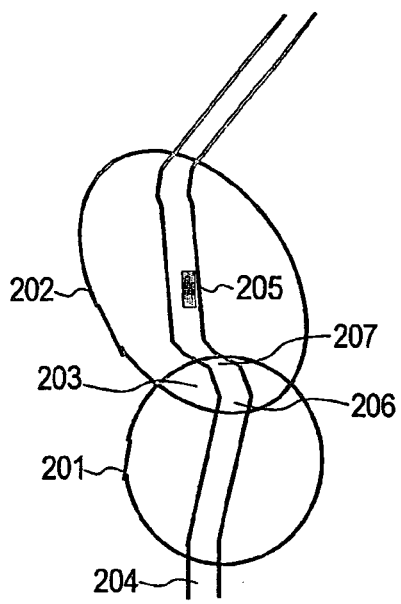
FIG. 2 shows an example of locating a subscriber by means of the message containing a handover command.

FIG. 2 shows an example of locating a subscriber by means of the message containing a handover material. FIG. 2 shows two cells 201, 202 and the geographical intersection area 203 between the cells 201, 202. A vehicle 205 is traveling on road 204. The intersection area 203 has two border areas 206, 207.

The present invention is partly based on the method described in patent application FI20030086. A temporary subscriber identity is used in this prior method. Because the temporary subscriber identity usually changes at the borders of LACs, the location areas known by the prior method are in practice LACs. The areas observed in the present invention are cells.

In the prior method the message traffic is observed in the border areas of two LACs. In the first embodiment of patent application FI20030427 the message traffic is observed in the border areas of two cells. The present invention differs from the prior method and this first embodiment, because the distance traveled by a subscriber stretches through the whole cell and said distance is used for calculating the velocity of the subscriber.

Figure 3:
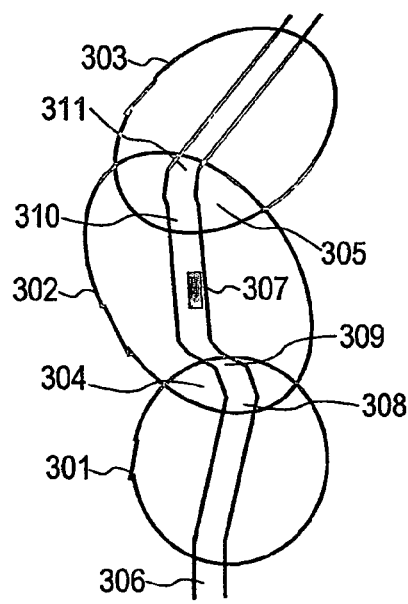
FIG. 3 shows an example of measuring a subscriber's velocity by means of the message containing a handover command.

FIG. 3 shows an example of locating a subscriber according to the second embodiment of the invention. In the second embodiment locating is based on a message pair so that the messages are obtained during two handovers. The figure shows three cells 301, 302, and 303, the geographical intersection area 304 between the cells 301 and 302, and the geographical intersection area 305 between the cells 302 and 303. A vehicle 307 can be also seen in the figure travelling from the cell 301 along a road 306 toward the cell 302, the vehicle carrying a mobile station with it. A first message is received from intersection area 304 of the cells and a second message is received, when the vehicle moves ahead to intersection area 305. In more detail, when the messages are HandOver Command messages, the first message is obtained from the border area 308 of intersection area 304 and the second message is obtained from the border area 309 of intersection area 305. The velocity of the vehicle is measured so that the distance traveled by the vehicle is the distance from border area 308 along the road 306 to border area 309 and the time lapsed during the travel is the time interval from the point of time when the first message was received to the point of time when the second message was received.

The messages used in locating are preferably messages that are transmitted or received by a mobile network and that are extracted through the Abis interface from the signalling traffic. In that case the above-mentioned "a time slot of a radio channel" is a signalling time slot of an E1 link of the Abis interface. It is reasonably simple to implement monitoring of the messages of a base station controller, or in more general, monitoring of the messages of a mobile network. The messages to be extracted may also be messages that are transmitted in air interface.

Figure 4:
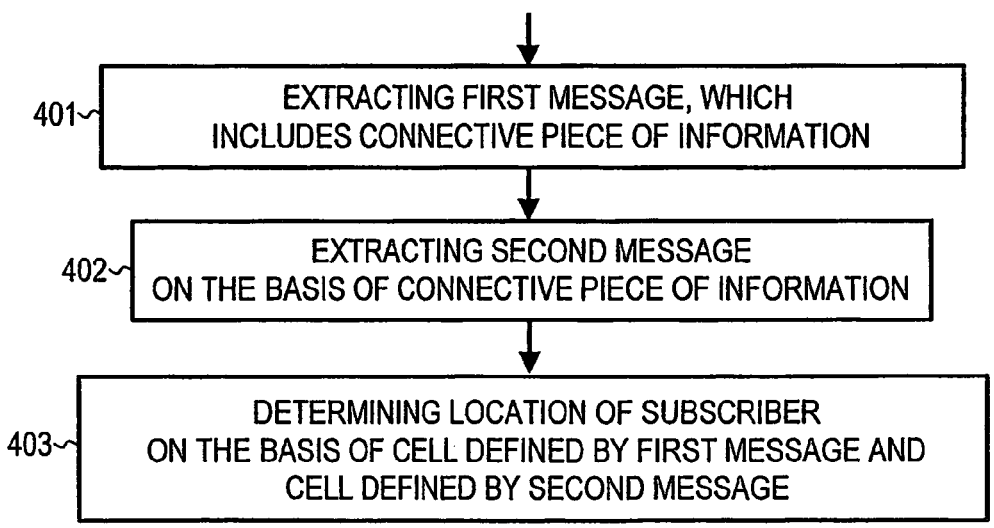
FIG. 4 shows operation of the system for locating subscribers.

FIG. 4 shows the operation of the method for locating subscribers. The method comprises the step of extracting a first message, which includes a connective piece of information on the basis of which a second message transmitted in the mobile network is to be extracted. The second message is then extracted based on the connective piece of information. The location of the subscriber is then determined based on a current cell defined by the first message and a new cell defined by the second message.

In addition to the location of the subscriber, the steps shown in FIG. 4 also result in information about the direction in which the subscriber is moving. These pieces of information are often adequate from the point of view of a statistical survey, or another analysis. When needed, the velocity of the subscriber can also be calculated. The velocity is obtained by using the way shown in FIG. 3. The distance traveled by the subscriber is the distance between the border areas 308 and 309 and the time lapsed for the travel is the time interval between the messages obtained from these border areas. As shown in the above FIG. 2, subscriber 'X' can be traced from one cell to another, if needed. A demand for this kind of tracing depends on the analysis to be performed.

Figure 1:
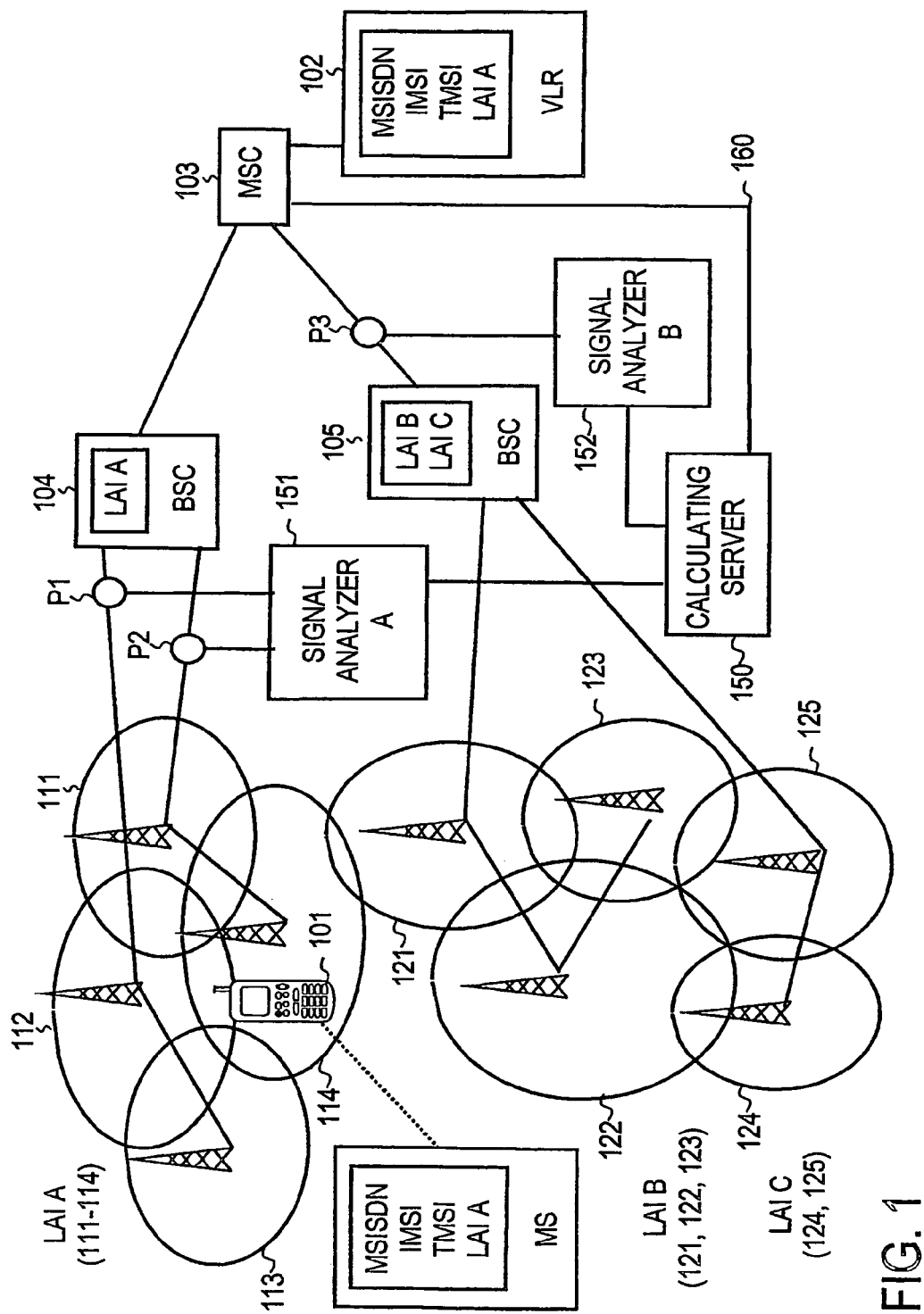
FIG. 1 shows operation of a prior art location system.

The locating system according to the invention is at least adapted to perform the method steps shown in FIG. 4. As shown in FIG. 1, one or more signal analysers can be utilized in the system. However, it is obvious for a person skilled in the art that a system according to the invention can also be implemented in other ways.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for locating anonymously busy and idle subscribers so that each subscriber is located on the basis of two messages, the subscribers moving between cells of a mobile network, the method including the steps of:

extracting by extracting means through an Abis interface a first message transmitted in the mobile network, the first message defining a current cell of a subscriber of the mobile network and the first message including a piece of information on the basis of which a second message transmitted in the mobile network is to be extracted, attaching a first time stamp to the first message which discloses a point of time when the first message was extracted, extracting by the extracting means through the Abis interface the second message which defines a new cell of the subscriber, wherein the first and second messages are extracted from signal traffic of at least one E1 connection of the Abis interface, and attaching a second time stamp to the second message which discloses a point of time when the second message was extracted, determining by a calculating server a location of the subscriber on the basis of the current cell defined by the first message and the new cell defined by the second message, wherein the location is at least partly situated in a geographical intersection of the current and new cells, wherein the calculating server determines a first border area of the geographical intersection based on the current cell defined by the first message and a second border area of the geographical intersection based on the new cell defined by the second message so that both busy and idle subscribers can be anonymously located on the basis of the first and second messages, and on the basis of a location read from a memory and another location, determining a distance which the subscriber has traveled, and determining by the calculating server a velocity of the subscriber is determined on the basis of the distance, the first time stamp, and the second time stamp, wherein the distance traveled by the subscriber is the distance between the two border areas situated in the geographical intersection of the cells defined by the first and the second message; and repeating the method to determine a velocity of at least one further subscriber as part of a statistical survey concerning velocities of subscribers.

2. The method as in claim 1, wherein the first message is a HandOver Command message and the second message is a Channel Activation message.

3. The method of claim 2, wherein the piece of information is a reference number of the handover.

4. The method as in claim 1, wherein the extracting means comprises at least one signal analyzer which is adapted to send data the calculation server.

5. The method of claim 1, wherein the first message is a HandOver Command and the second message is a Channel Activation Acknowledgement message.

6. The method of claim 1, wherein the first message is a HandOver Command and the second message is a HandOver Detect.

7. The method of claim 1, wherein the new cell belongs to a location area that is different than that of the current cell.

* * * * *